United States Patent
Lee

(10) Patent No.: US 12,273,433 B2
(45) Date of Patent: Apr. 8, 2025

(54) SYSTEM FOR TIME SYNCHRONIZATION BETWEEN SERVER AND IOT DEVICE

(71) Applicant: SUNG CHANG CO., LTD, Chungcheongbuk-do (KR)

(72) Inventor: Jae Jin Lee, Sejong (KR)

(73) Assignee: SUNG CHANG CO., LTD, Chungcheongbuk-do (KR)

( * ) Notice: Subject to any disclaimer, the term of this patent is extended or adjusted under 35 U.S.C. 154(b) by 0 days.

(21) Appl. No.: 17/949,384

(22) Filed: Sep. 21, 2022

(65) Prior Publication Data

US 2023/0171082 A1  Jun. 1, 2023

(30) Foreign Application Priority Data

Nov. 29, 2021 (KR) .................. 10-2021-0166615

(51) Int. Cl.
| | |
|---|---|
| *H04B 17/318* | (2015.01) |
| *G05B 19/042* | (2006.01) |
| *H04L 7/04* | (2006.01) |
| *H04W 24/10* | (2009.01) |
| *H04W 56/00* | (2009.01) |
| *H04W 84/12* | (2009.01) |
| *H04W 84/18* | (2009.01) |

(52) U.S. Cl.
CPC ....................................... *H04L 7/04* (2013.01)

(58) Field of Classification Search
CPC ... H04L 7/04; H04L 67/62; H04L 7/02; H04L 67/12; H04W 56/0065
See application file for complete search history.

(56) References Cited

U.S. PATENT DOCUMENTS

| | | | |
|---|---|---|---|
| 9,037,405 B2 * | 5/2015 | Gourlay | G08G 1/096844 |
| | | | 701/465 |
| 9,412,272 B2 * | 8/2016 | Lee | G08G 1/081 |
| 9,954,669 B2 * | 4/2018 | Perez-Cruz | H04W 56/002 |

(Continued)

FOREIGN PATENT DOCUMENTS

| | | |
|---|---|---|
| JP | 2011-216085 A | 10/2011 |
| KR | 10-0673420 B1 | 1/2007 |

(Continued)

OTHER PUBLICATIONS

Office Action from corresponding Korean Patent Application No. 10-2021-0166615, dated Feb. 22, 2023.

(Continued)

*Primary Examiner* — Hee Soo Kim
*Assistant Examiner* — Golam Mahmud
(74) *Attorney, Agent, or Firm* — Harness, Dickey & Pierce, P.L.C.

(57) ABSTRACT

Provided is a system for time synchronization between a server and an Internet-of-Things (IoT) device. The system may include a server configured to broadcast a time-point synchronization signal including absolute time point information; and an IoT device configured to receive the broadcast time-point synchronization signal and calculate absolute time point information by using the absolute time point information included in the time-point synchronization signal, computation time information according to an internal computation operation, and transmission time information required to receive the time-point synchronization signal.

3 Claims, 2 Drawing Sheets

(56) References Cited

U.S. PATENT DOCUMENTS

| | | | | |
|---|---|---|---|---|
| 10,298,344 | B1* | 5/2019 | Devineni | H04J 3/0697 |
| 10,820,170 | B1* | 10/2020 | Huberman | H04B 17/318 |
| 11,249,195 | B1* | 2/2022 | Anvari | H04W 4/80 |
| 11,316,633 | B2* | 4/2022 | Kim | G01S 1/045 |
| 2005/0003828 | A1* | 1/2005 | Sugar | H04W 24/00 |
| | | | | 455/422.1 |
| 2005/0058149 | A1* | 3/2005 | Howe | H04L 49/602 |
| | | | | 370/428 |
| 2011/0264778 | A1* | 10/2011 | McGregor | G06F 9/5016 |
| | | | | 709/234 |
| 2014/0059182 | A1* | 2/2014 | Miura | H04L 65/60 |
| | | | | 709/219 |
| 2017/0195109 | A1 | 7/2017 | Perez-Cruz et al. | |
| 2018/0198857 | A1* | 7/2018 | Kawazoe | H04L 67/1025 |
| 2020/0349831 | A1* | 11/2020 | Baek | G08B 21/0272 |
| 2020/0382931 | A1* | 12/2020 | Sun | H04W 4/80 |
| 2021/0219254 | A1* | 7/2021 | Wang | H04W 56/0015 |
| 2021/0281645 | A1* | 9/2021 | Onishi | H04L 67/60 |
| 2021/0367695 | A1* | 11/2021 | Moon | H04J 3/12 |
| 2022/0141790 | A1* | 5/2022 | Kasichainula | H04W 56/0015 |
| | | | | 370/350 |
| 2022/0279311 | A1* | 9/2022 | Luo | H04W 4/029 |

FOREIGN PATENT DOCUMENTS

| | | |
|---|---|---|
| KR | 10-2015-0084917 A | 7/2015 |
| KR | 10-2018-0025613 A | 3/2018 |
| KR | 10-2066977 B1 | 1/2020 |

OTHER PUBLICATIONS

Blog, Packet delay, loss, throughput,<URL: https://ddongwon.tistory.com/70>; Dong1, 2021, pp. 1-3.

International Search Report from corresponding PCT Application No. PCT/KR2022/013182, dated Mar. 6, 2023.

Extended European Search Report from corresponding European Patent Application No. 22196003.2, dated Mar. 29, 2023.

Allahi, I., et al.; "Performance Evaluation of IEEE 1588 Protocol Using Raspberry Pi over WLAN", 2018 IEEE International Conference on Communication Systems (ICCS), pp. 315-320.

Office Action from corresponding Korean Patent Application No. 10-2021-0166615, dated Nov. 24, 2023.

"https://ddongwon.tistory.com/70" (Jan. 15, 2021), retrieved from the internet.

* cited by examiner

SYSTEM FOR TIME SYNCHRONIZATION BETWEEN SERVER AND IOT DEVICE

CROSS-REFERENCE TO RELATED APPLICATION

This application claims priority from Korean Patent Application No. 10-2021-0166615 filed on Nov. 29, 2021 in the Korean Intellectual Property Office, and all the benefits accruing therefrom under 35 U.S.C. 119, the contents of which in its entirety are herein incorporated by reference.

TECHNICAL FIELD

The following description relates to time synchronization, and more particularly, to a system for time synchronization between a server and an Internet-of-Things (IoT) device.

BACKGROUND

Multiple LPWA (Low Power Wide Area) technology standards for Internet of Things (IoT) services supporting low-power wide-area networks have been employed and are in commercial service in current days.

IoT communication allows a wireless exchange of information between multiple user terminals that operate only on battery power, which is auxiliary power, without main power. As such, since several user terminals perform communication based on low power in IoT communication, it is essential to establish a communication network based on LPWA.

LPWA technologies can be classified into NB-IoT, LTE-M (Cat.M1), LoRa, Sigfox, and the like.

NB-IoT is a Low Power Wide Area (LPWA) technology defined in 3GPP Rel. 13. NB-IoT adjusts when IoT devices transmit data so that numerous IoT devices connected to a base station (eNodeB) can share and use a low-rate data transmission band.

In order for IoT devices to transmit data, the IoT devices issue a transmission request to an eNodeB using a random access channel (RACH). Then, the eNodeB sends a scheduling grant to allocate time and frequency to the corresponding IoT devices, and the IoT devices transmit data accordingly.

LTE-M (Cat.M1) technology uses frequencies such as 800 MHZ, 1.8 GHz, and 2.1 GHZ, which are the existing LTE bands and has a transmission rate of 200 kbps, and standardization thereof is led by the 3rd Generation Public Partnership (3GPP). LTE-M (Cat.M1) is suitable for low-power, long-range communication and uses the existing LTE networks.

LoRa technology mainly uses a frequency of 900 MHZ, which is an unlicensed band, and has a transmission rate of 300 bps to 5 kbps, and standardization thereof is led by the LoRa Alliance, in which approximately 170 companies, such as Cisco, IBM, SKT, etc., have participated. LoRa technology is suitable for low-power, long-range communication and needs to build a separate communication network for use.

Sigfox technology also uses a frequency of 900 MHz, which is an unlicensed band, and has a transmission rate of 100 bps. The ETSI (European Telecommunications Standards Institute) has promoted Sigfox technology-based standardization. Sigfox technology is suitable for low-power, long-range communication, and uses a separate communication network.

When data is transmitted and received between a server and IoT devices through such LPWA technologies, transmission delay varies depending on the number of IoT devices connected to an LPWA service network, the size of data to be transmitted, and the number of retransmissions. For example, the order and time of data transmitted from each IoT device to the server are not constant, and the times of arrival to the server and the transmission times of each IoT may be changed.

Time point authentication, synchronization, retransmission, etc. are core techniques of a server. It is necessary to synchronize the absolute time based on a server time, but an error of several hundred ms may occur for each IoT device depending on the network delay rate.

SUMMARY

Aspects of the present disclosure provide a system for time synchronization between a server and an Internet-of-Things (IoT) device.

According to an aspect of the present disclosure, there is provided a system for time synchronization between a server and an IoT device, including a server configured to broadcast a time-point synchronization signal including absolute time point information; and an IoT device configured to receive the broadcast time-point synchronization signal and calculate absolute time point information by using the absolute time point information included in the time-point synchronization signal, computation time information according to an internal computation operation, and transmission time information required to receive the time-point synchronization signal.

The IoT device may calculate the absolute time point information using a plurality of pieces of transmission time information obtained by exchanging the time-point synchronization signal with the server at least twice.

The IoT device may calculate an average value of the plurality of pieces of transmission time information and calculate the absolute time point information by using the calculated average time information.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

The present invention will be described more fully hereinafter with reference to the accompanying drawings, in which exemplary embodiments of the invention are shown.

The disclosure may, however, be embodied in many different forms and should not be construed as limited to the embodiments set forth herein.

Figure 1:
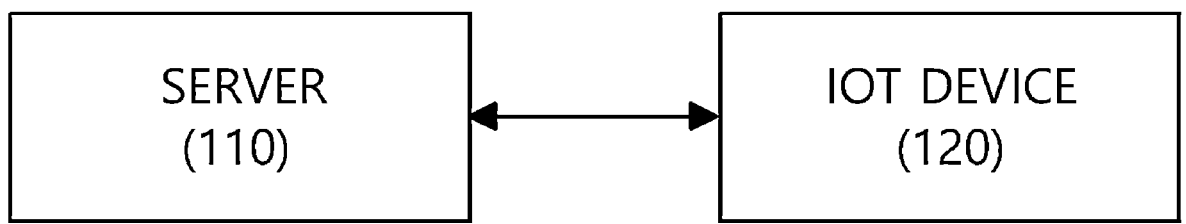
FIG. 1 is a block diagram illustrating a system for time synchronization between a server and an Internet-of-Things (IoT) device according to the present disclosure.

FIG. 1 is a block diagram illustrating a system 100 (hereinafter referred to as a "time synchronization system") for time synchronization between a server and an Internet-of-Things (IoT) device according to the present disclosure.

Figure 2:
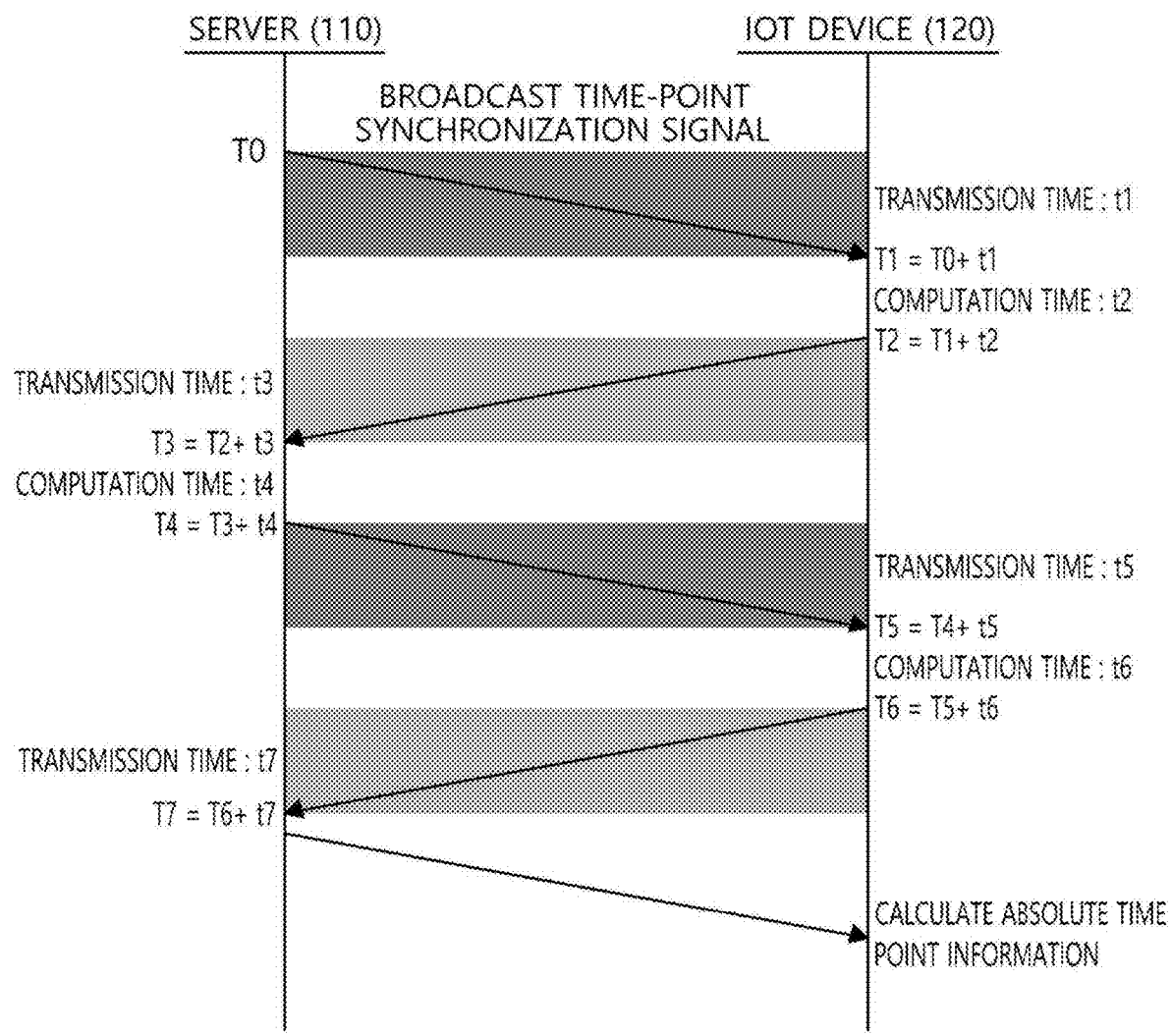
FIG. 2 is a timing diagram illustrating a process of exchanging a time synchronization signal between a server and an IoT device.

FIG. 2 is a timing diagram illustrating a process of exchanging a time synchronization signal between a server and an IoT device.

Referring to FIG. 1, the time synchronization system 100 includes a server 110 and an IoT device 120. Here, there may one IoT device 120, or the IoT device 120 may include a plurality of devices.

The server 110 broadcast a time-point synchronization signal including absolute time point information.

The server 110 is connected to a communication network, such as NB-IoT network, LTE-M (Cat.M1) network, LoRa network, Sigfox network, or the like, to broadcast the time-point synchronization signal.

The server 110 may use network time protocol (NTP) to synchronize terminal time. The NTP is a procedure in which an NTP_client sends an NTP_query message to an NTP_server and receives an NTP_reply message to synchronize the time of the NTP_client to the NTP_server as much as possible. That is, the server 110, as an NTP_client, may send an NTP_query message to the NTP_server and receive an NTP_reply to broadcast time information included in the received message as absolute time point information of the server 110. Referring to FIG. 2, the server broadcasts a time-point synchronization signal including current absolute time point information TO.

The IoT device 120 receives the broadcast time-point synchronization signal and calculates information on a current absolute time-point by using the information on an absolute time-point included in the time-point synchronization signal, computation time information according to an internal computation operation, and transmission time information required to receive the time-point synchronization signal. Since the IoT device 120 is connected to the server 110 and the communication network, such as NB-IoT network, LTE-M (Cat.M1) network, LoRa network, Sigfox network, or the like, the IoT device 120 may receive the time-point synchronization signal broadcast by the server 110.

The IoT device 120 may calculate an average value of a plurality of pieces of transmission time information obtained by exchanging the time-point synchronization signal with the server 110 at least twice, and calculate the absolute time point information by using the calculated average time information.

Referring to FIG. 2, the IoT device 120 receives the time-point synchronization signal broadcast by the server 110. A transmission time required for the IoT device 120 to receive the time-point synchronization signal from the server 110 is $t_1$. The transmission time $t_1$ for the time-point synchronization signal cannot be accurately identified by the IoT device 120, and may be estimated through calculation thereafter. The IoT device 120 may calculate the absolute time point information $T_1$ ($T_1=T_0+t_1$) by adding the absolute time point information $T_0$ included in the time-point synchronization signal by the server 110 and the transmission time $t_1$.

The IoT device 120 may calculate computation time information $t_2$ according to an internal computation operation by using a real-time clock (RTC) module. The RTC module may be included as a part of a microchip in the IoT device 120, and may calculate the computation time information $t_2$ according to an internal computation operation based on a real-time clock.

Thereafter, the IoT device 120 may calculate absolute time point information $T_2$ ($T_2=T_1+t_2$) by adding the absolute time point information $T_1$ and the computation time information $t_2$ according to the internal computation operation.

Then, the IoT device 120 transmits a time-point synchronization signal including the calculated absolute time point information $T_2$ to the server 110.

Referring to FIG. 2, the server 110 receives the time-point synchronization signal including the absolute time point information $T_2$ from the IoT device 120. A transmission time required for the server 110 to receive the time-point synchronization signal including the absolute time point information $T_2$ from the IoT device 120 is $t_3$. The server 110 may calculate absolute time point information $T_3$ ($T_3=T_2+t_3$) by adding the absolute time point information $T_2$ received from the IoT device 120 and the transmission time $t_3$ required to receive the absolute time point information $T_2$ from the IoT device 120.

Thereafter, the server 110 may calculate computation time information $t_4$ according to an internal computation operation by using an RTC module. Then, the server 110 may calculate absolute time point information $T_4$ ($T_4=T_3+t_4$) by adding the absolute time point information $T_3$ and the computation time information $t_4$ according to the internal computation operation.

Then, the server 110 transmits a time-point synchronization signal including the calculated absolute time point information $T_4$ to the IoT device 120. At this time, the server 110 transmits the absolute time point information $T_3$ along with the absolute time point information $T_4$ to the IoT device 120 when transmitting the time-point synchronization signal.

Referring to FIG. 2, the IoT device 120 receives the time-point synchronization signal including the absolute time point information $T_4$ and the absolute time point information $T_3$ from the server 110. A transmission time required for the IoT device 120 to receive the time-point synchronization signal including the absolute time point information $T_4$ from the server 110 is $t_5$. The IoT device 120 may calculate the absolute time point information $T_5$ ($T_5=T_4+t_5$) by adding the absolute time point information $T_4$ received from the server 10 and the transmission time $t_5$ required to receive the absolute time point information $T_4$.

Thereafter, the IoT device 120 may calculate absolute time point information $T_6$ ($T_6=T_5+t_6$) by adding the absolute time point information $T_5$ and computation time information the according to an internal computation operation.

Then, the IoT device 120 transmits a time-point synchronization signal including the calculated absolute time point information $T_6$ to the server 110.

Referring to FIG. 2, the server 110 receives the time-point synchronization signal including the absolute time point information $T_6$ from the IoT device 120. A transmission time required for the server 110 to receive the time-point synchronization signal including the absolute time point information $T_6$ from the IoT device 120 is $t_7$. The server 110 may calculate absolute time point information $T_7$ ($T_7=T_6+t_7$) by adding the absolute time point information $T_6$ received from the IoT device 120 and the transmission time $t_7$ required to receive the absolute time point information $T_6$ from the IoT device 120.

Then, the server 110 transmits a time-point synchronization signal including the calculated absolute time point information $T_7$ to the IoT device 120. Accordingly, the IoT device 120 receives the time-point synchronization signal including the absolute time point information $T_7$ from the server 110.

The IoT device 120 may calculate a value of $t_1+t_3$ from the absolute time point information $T_3$ received from the server 110. That is, the value of $t_1+t_5$ may be calculated through $t_1+t_3=T_3-T_0-t_2$. Here, a value of each of $T_3$, $T_0$, and $t_2$ is provided by the server 110 or calculated by the IoT device 120.

In addition, the IoT device 120 may calculate a value of $t_5+t_7$ from the absolute time point information $T_7$ received from the server 110. That is, the value of $t_5+t_7$ may be calculated through $t_5+t_7=T_7-T_4-t_6$. Here, a value of each of $T_7$, $T_4$, and the is provided by the server 110 or calculated by the IoT device 120.

Thereafter, the IoT device 120 may calculate an average value of the plurality of pieces of transmission time information obtained by exchanging the time-point synchronization signal twice or more, and calculate the absolute time point information by using the calculated average time information. For example, the IoT device 120 may calculate an average value $t_{ave}$ of pieces of transmission time information $t_1$, $t_3$, $t_5$, and $t_7$, i.e., $t_{ave}=(t_1+t_3+t_5+t_7)/4$. The average value $t_{ave}$ may be used to estimate an absolute point in time for signal synchronization of the IoT device 120. That is, the IoT device 120 may calculate a value approximate to the absolute time point information $T_1$ by adding $t_{ave}$, instead of $t_1$, to $T_0$. Also, the IoT device 120 may calculate a value approximate to the absolute time point information $T_5$ by adding $t_{ave}$, instead of $t_5$, to $T_4$.

Thereafter, the IoT device 120 may transmit the calculated absolute time point information to the server 110.

According to the present disclosure, a server configured to broadcast a time-point synchronization signal including absolute time point information and an IoT device configured to calculate absolute time point information by using the absolute time point information included in the time-point synchronization signal, computation time information according to an internal computation operation, and transmission time information required to receive the time-point synchronization signal are provided, so that time synchronization can be easily performed through a simple information exchange between the server and the IoT device. Accordingly, a time synchronization system that only allows a time synchronization error within 1 ms can be provided.

Although the exemplary embodiments of the present disclosure have been described above, the embodiments disclosed in the specification are not intended to limit the present disclosure. The scope of the present disclosure should be interpreted through the following claims, and all equivalents thereof should be interpreted as being included within the scope of the present disclosure.

REFERENCE NUMERALS

100: TIME SYNCHRONIZATION SYSTEM
110: SERVER
120: IoT DEVICE

What is claimed is:

1. A system for time synchronization between a server and an Internet-of-Things (IoT) device, comprising:
    a server configured to execute first non-transitory media to broadcast a time-point synchronization signal including first absolute time point information; and
    an IoT device configured to execute second non-transitory media to receive the broadcast time-point synchronization signal and calculate second absolute time point information by using the first absolute time point information included in the time-point synchronization signal, computation time information according to an internal computation operation, and transmission time information required to receive the time-point synchronization signal, wherein the IoT device is configured to calculate the computation time information according to an internal computation operation based on a real-time clock,
    wherein the server is configured to receive a second time-point synchronization signal from the IoT device, calculate server computation time information according to computation time of an internal operation of the server using a real-time clock of the server, and transmit a third time-point synchronization signal to the IoT device, the third time-point synchronization signal including third absolute time point information based on the calculated server computation time.

2. The system of claim 1, wherein the IoT device is configured to calculate the second absolute time point information using a plurality of pieces of transmission time information obtained by exchanging the time-point synchronization signal with the server at least twice.

3. The system of claim 2, wherein the IoT device is configured to calculate an average value of the plurality of pieces of transmission time information and calculate the second absolute time point information by using the calculated average value of the plurality of pieces of transmission time information.

* * * * *